United States Patent [19]
Chang et al.

[11] Patent Number: 5,207,000
[45] Date of Patent: May 4, 1993

[54] METHOD AND APPARATUS USEFUL FOR DETERMINING AN ANGLE BETWEEN A VIRTUAL OPTICAL AXIS AND A PLANAR SURFACE

[75] Inventors: Yung-Sheng Chang, Taichung; Shing-Seng Wang, Tau-Yuan; Ming-Daw Chen, Hsinchu, all of Taiwan

[73] Assignee: Industrial Technology Research Institute, Taiwan

[21] Appl. No.: 715,830

[22] Filed: Jun. 14, 1991

[51] Int. Cl.$^5$ .............................................. G01C 1/00
[52] U.S. Cl. .................... 33/1 N; 33/1 LE; 33/413
[58] Field of Search ............ 33/1 N, 1 LE, 413, 262, 33/263, 275 R, 281, 645, 756

[56] References Cited
U.S. PATENT DOCUMENTS 2,632,952  3/1953  Mallow ............................. 33/1 LE
2,788,584  4/1957  Adrien .................................. 33/645
4,731,933  3/1988  Cope .................................. 33/1 LE

OTHER PUBLICATIONS

Castle, "Photographic Test Pattern", O. G. vol. 646, p. 323, May 1, 1951.

*Primary Examiner*—William A. Cuchlinski, Jr.
*Assistant Examiner*—Alvin Wirthlin
*Attorney, Agent, or Firm*—Darby & Darby

[57] ABSTRACT

A line is extended along a virtual optical axis of an objective lens. The line extends between a transparent plate, which is attached to the lens, and another transparent plate which is secured to a planar surface. The objective lens is part of an optical measuring instrument. An angle indicator is secured to the planar surface. The angle indicator is rotatable so that where the line touches the angle indicator, the angle between the planar surface and the virtual optical axis may be read with respect to azimuth and elevation.

34 Claims, 6 Drawing Sheets

METHOD AND APPARATUS USEFUL FOR DETERMINING AN ANGLE BETWEEN A VIRTUAL OPTICAL AXIS AND A PLANAR SURFACE

BACKGROUND OF THE INVENTION

The present invention relates to determining an angle between a virtual optical axis and a planar surface by making the virtual optical axis visible.

DISCUSSION OF RELATED ART

Liquid crystal projection displays involve the projection of a video image onto a screen. The type of screen selected may vary depending upon the distribution of light desired for an audience which views the screen. The screen may be a plain white diffusing surface, which appears equally bright when viewed from any distance or any angle and is satisfactory where the image projected on the screen is bright enough generally for comfortable viewing.

For some video projections, it may be desired to redistribute the light in such a way as to increase the screen brightness for part of the audience while reducing the brightness for another part. This is referred to as screen gain. The selection of the type of screen is therefore important in the attainment of the desired visual effect.

Different types of screens may cause the distribution of light to vary depending upon the particular viewing angle by a given part of the audience. Beaded, lenticular vertical and lenticular horizontal are examples of types of screens which cause the distribution of light to vary dependent upon viewing angle. Such screens distribute light to provide a visual effect which contrasts from that provided by the plain white screen, which substantially maintains the same brightness level regardless of the viewing angle.

Brightness level and the color coordinates of a screen may be measured with an optical instrument such as a chromameter. However, such an instrument does not measure the viewing angle, i.e., the angle between the virtual optical axis of the instrument's objective lens and the plane of the screen. It would therefore be desireable to measure such an angle for a series of different viewing angles so that a graphical plot of the normalized brightness at each viewing angle may be obtained to reveal a brightness characteristic for the screen.

SUMMARY OF THE INVENTION

The present invention is directed at a method and apparatus for use in determining an angle between a virtual optical axis of an optical instrument and the plane of a surface being examined with respect to azimuth and elevation. The method and apparatus involve identifying a virtual optical axis between an objective lens and a planar surface, extending a visible line element along the virtual optical axis, and measuring an angle between the visible line element and the planar surface with respect to azimuth and elevation. Preferably, an angle indicator is mounted on the planar surface so as to enable the reading of the angle based on where the line element touches the angle indicator. The angle indicator preferably has azimuth and elevation angle gradations.

Reading of the angle becomes possible after rotating the angle indicator as necessary until the line element touches the angle indicator in the vicinity of the elevation angle gradations, with respect to which the elevation angle may be read. The extent to which the angle indicator is rotated determines the azimuth angle, which may be read with respect to the azimuth gradations.

The visible line element is made taut by fixing the line element at one end in a hole at a center of the angle indicator and by pulling the other end of the line element through holes in a transparent plate which is fixed to the objective lens. The angle indicator may be held in position on the planar surface by magnetic forces and by a counter balancing plumb line if needed.

The present invention may be used for ascertaining the angle between the planar surface and a virtual optical axis of any kind of optical measurement instrument which has an objective lens, such as a camera, a video camera, a chromameter and a spectroradiometer.

BRIEF DESCRIPTION OF THE DRAWINGS

For a better understanding of the present invention, reference is made to the following description and accompanying drawings, while the scope of the invention is set forth in the appended claims.

DESCRIPTION OF THE PREFERRED EMBODIMENT

Figure 1:
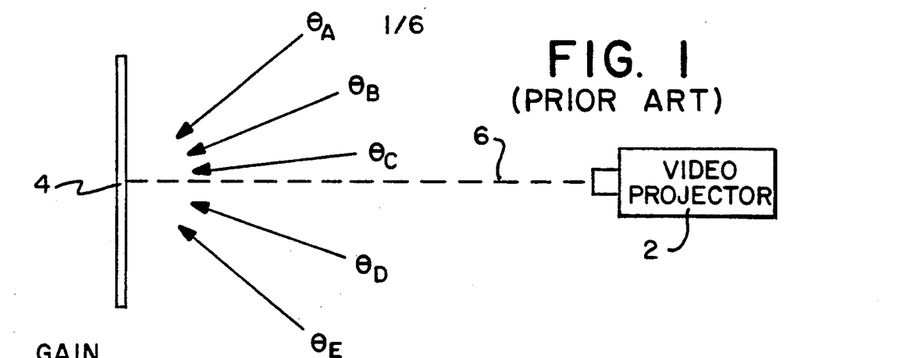
FIG. 1 is a top view of a projection system which depicts the viewing angle relationship between a screen and an audience as is known is the prior art.

FIG. 1 shows a video projector 2 which projects an image onto a screen 4. Each member of an audience viewing the image projected onto the screen will be at a different viewing angle as represented by arrows $\theta_A$, $\theta_B$, $\theta_C$, $\theta_D$, $\theta_E$.

Figure 2:
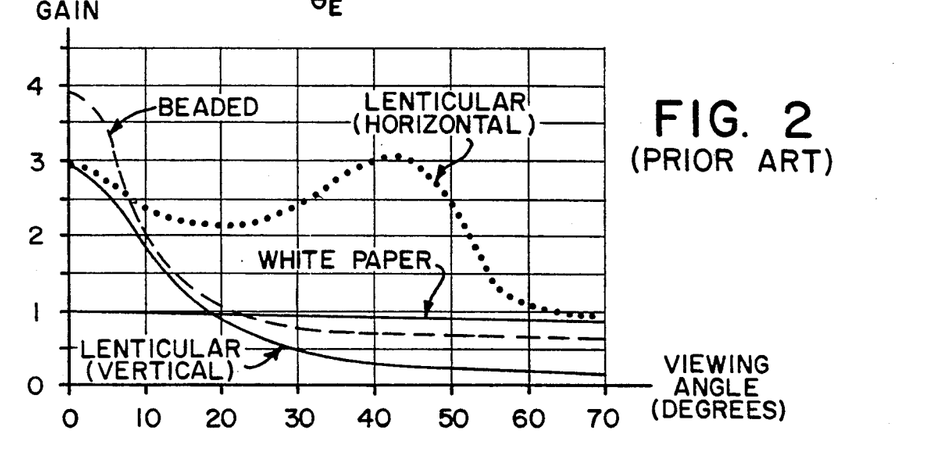
FIG. 2 is a graphical representation of screen gain with respect to viewing angle for different types of screens.

FIG. 2 shows a plot of screen gain versus viewing angle for the right side of the center line 6 of FIG. 1 for different types of screens, i.e., white paper, beaded, lenticular (vertical) and lenticular (horizontal). FIG. 2 is taken from a book entitled "Optical System Design", Rudolf Kingslake, Academic Press, New York, 1983.

It can be appreciated that the selection of white paper for the screen results in the screen gain or screen brightness being almost the same from any viewing angle. If a beaded screen is selected, the brightness of the screen at a viewing angle of zero degrees will be four times that at a viewing angle of 20 degrees. Thus, for the beaded and lenticular (horizontal and vertical) screens, the screen brightness may vary significantly at one viewing angle as opposed to another. The lenticular screens may be made of glass or transparent plastic.

Figure 3:
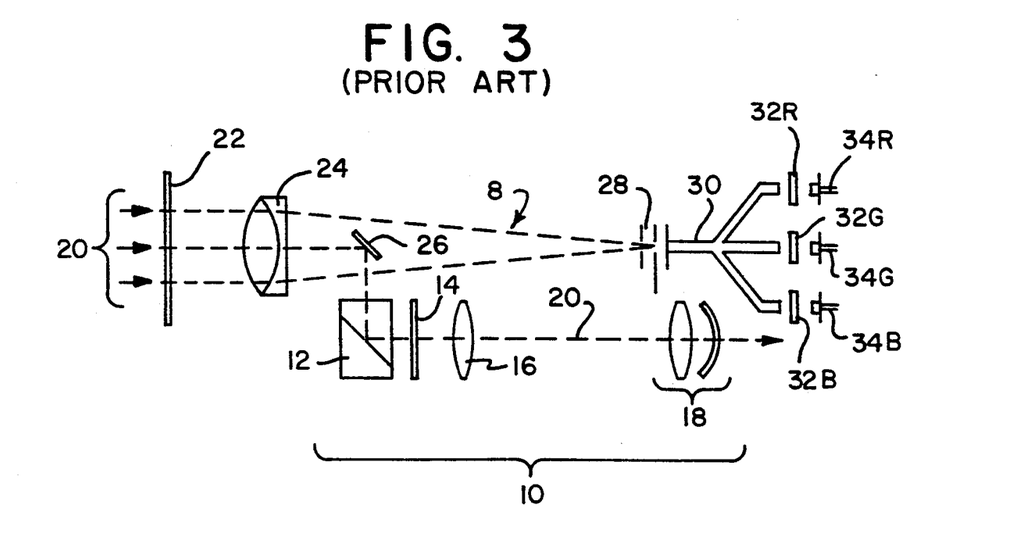
FIG. 3 is a schematic representation of a conventional optical measuring instrument.

FIG. 3 depicts a schematic for a conventional optical measuring instrument 8, such as the Minolta chromameter CS-100. A viewfinder 10 includes a reflecting prism 12, focal plane 14, eyepiece lens assembly 16 and eyepiece lens assembly 18. A virtual optical axis 20 passes through the center of the focal plane 14. The instrument 8 also has a protective lens 22, an objective lens 24, a reflecting mirror 26, a slit 28, and optical fibers 30 which pass through color filters 32R (red), 32G (green), and 32B (blue). The instrument 8 also has three detectors 34R, 34G, 34B which respectively read out and provide data that is indicative of the intensity of red, green, and blue colored light as filtered. Based on this data from the detectors, the instrument 8 may calculate the brightness and color coordinate of the image which is seen in the viewfinder 10.

Figure 4:
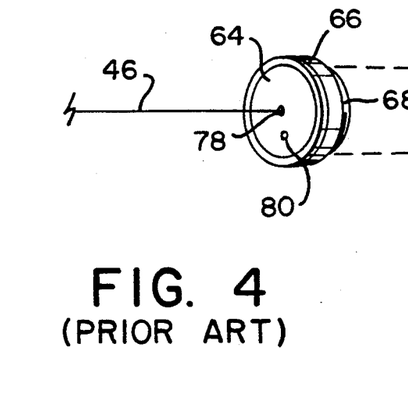
FIG. 4 is a schematic representation of what is seen when looking through a viewfinder of the conventional optical measuring instrument of FIG. 3.

FIG. 4 is indicative of the focal plane 14 which is seen when looking through the viewfinder 10 (from the right of lens assembly 18) of the Minolta Chromameter CS-100. The view may vary for other chromameters and other types of optical measuring instruments.

The focal plane 14 has a circular or crossed reticle 36. The virtual optical axis 20 passes through the center of the reticle 36. Thus, when an image of an object being viewed passes through each of the objective lens 24, the reflecting mirror 26, and the reflective prism 12, the object is considered to be aligned with the optical measuring instrument 8 when the image forms on the reticle 36 of the focal plane 14. When this alignment occurs, the object is situated at an extension of the virtual optical axis 20. Thus, measurements with the detectors 34R, 34G, 34B may be made. The measured value of some optical characteristic, as detected by the detectors, appears as a value 38 in an LCD display 40 on the focal plane 14.

Figure 5:
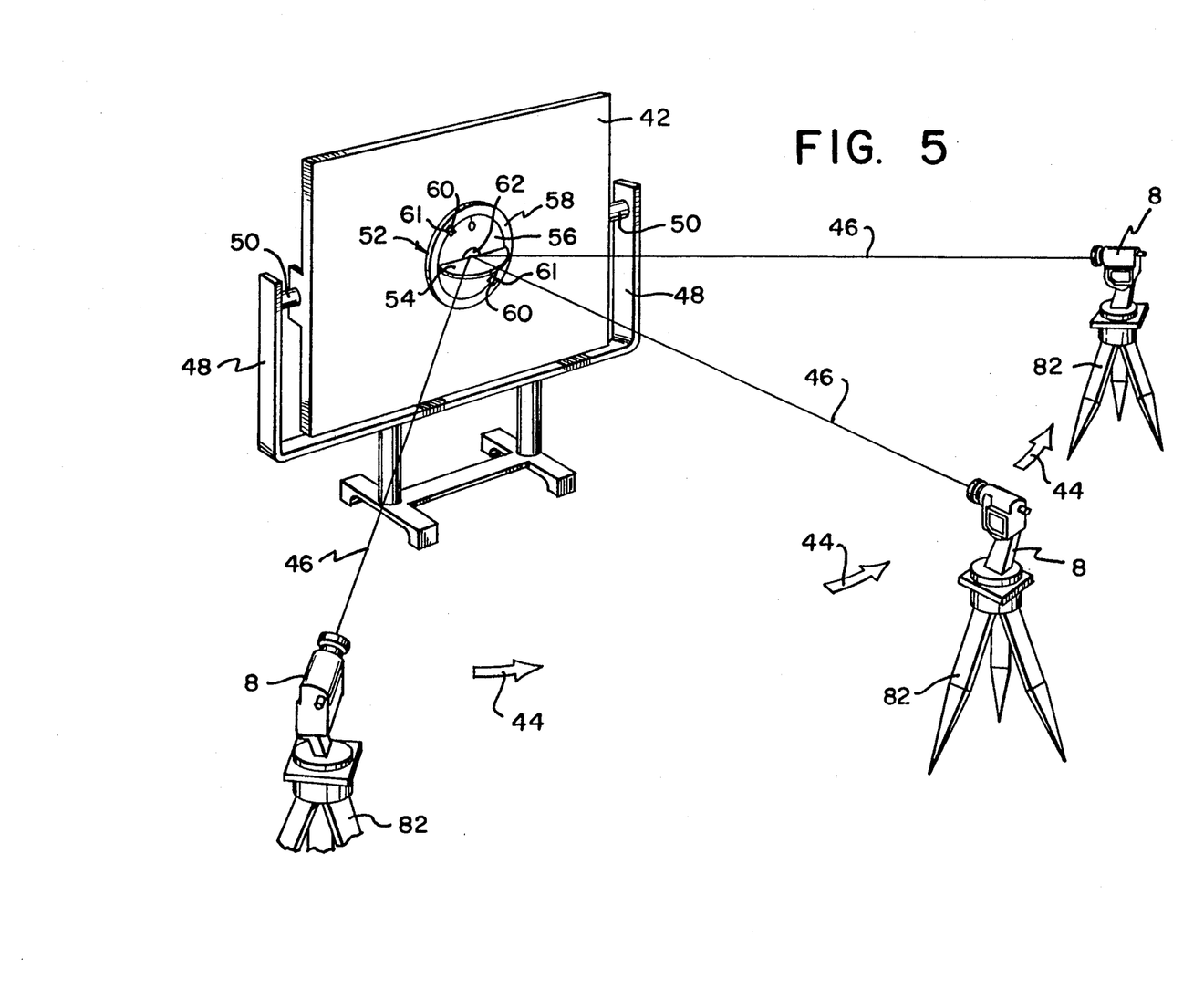
FIG. 5 is a perspective view of an angle indication system in accordance with the present invention in use at different viewing angles.

FIG. 5 shows an arrangement suitable for measuring an angle between the virtual optical axis 20 and the planar surface of an object being observed. In this case, the object is an area on a screen 42. The optical measuring instrument 8 is shown at three different locations at different points in time each location being indicative of a different viewing angle of the screen as would be viewed by different members of an audience. The double line arrows 44 exemplify the direction in which the instrument 8 may be relocated for taking measurements at different viewing angles.

A visible line element 46 of FIG. 5 extends between the objective lens 24 (see FIG. 6) of the instrument 8 and the screen 42. The line element may be a string, rope, cord, wire, cable, thread or similar type of material which forms a line. For instance, nylon thread is satisfactory. The screen 42 is hingably connected to a base 48 so as to be rotatable about a hinge 50. The screen 42 may be fastened in position with respect to the base in any known manner.

An angle indicator 52 is secured to the screen 42 preferably magnetically by having a magnet on its back (not visible in the drawing) and by having the screen contain a magnetically attractable layer. The angle indicator 52 has an elevation angle indication disc 54 and an azimuth angle indication disc 56. The azimuth angle indication disc 56 is rotatable with respect to an outer ring base 58, but may be secured in position by fasteners 60. A center plate 62 is adapted for retaining an end of the line element 46 and is transparent. Based on the designations of elevation angle indication disc 54 and azimuth angle indication disc 56, the screen 42 serves as a frame of reference with respect to the azimuth and elevation designations.

Figure 6:
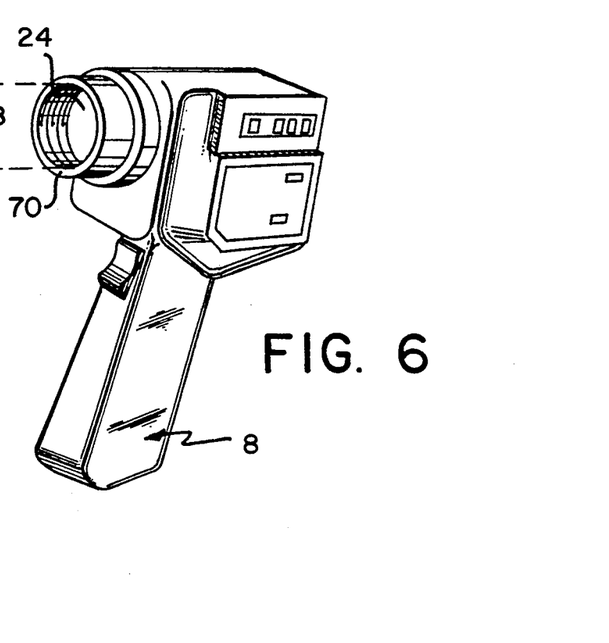
FIG. 6 is an exploded perspective view of a portion of FIG. 5 showing the manner in which a transparent circular plate is to be secured to an optical measurement instrument.
Figure 8:
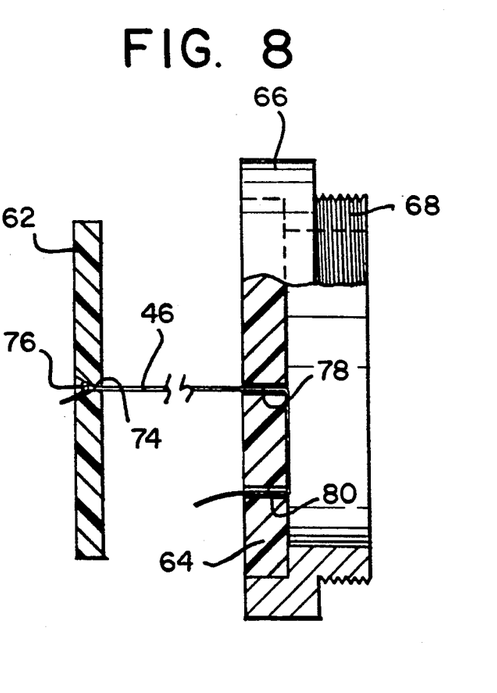
FIG. 8 is a longitudinal cross-section which depicts a line extending between the plates of FIGS. 6 and 7.

FIG. 6 shows the manner in which a transparent circular plate 64 is to be secured about the objective lens 24 of the optical instrument 8. The optical axis indication element or circular plate 64 is fitted into the metal ring 66 as seen in FIGS. 6 and 8. The metal ring 66 has outer facing threads 68 which engage with inwardly facing threads on the circular rim 70 about the objective lens 24.

The center plate 62 (see FIGS. 5 and 7) has a series of concentric circles 72. At its center is a hole 74 through which is extended the line element 46. The end of the line element is tied into a knot 76 (see FIG. 8) and thereby retained within a conical portion of the hole 74 that will face the screen 42. The center plate 62 is then secured to the screen 42 at the center of the angle indicator 52 shown in FIG. 5. The magnetic attraction between the magnets of the angle indicator 52 and the magnetic layer of the screen 42 helps secure one to the other.

The circular plate 64 has a central hole 78 and an other hole 80 spaced from the central hole 78. This other hole 80 may be considered to be eccentrically arranged. The line element 46 is extended through the central hole 78 and then pulled back through the other hole 80. The metal ring is then screwed onto the inwardly facing threads about the objective lens 24 of the optical measuring instrument. The line element 46 may be pulled taut as desired. Both the center plate 62 and the circular plate may be made of glass or transparent plastic.

Figure 9:
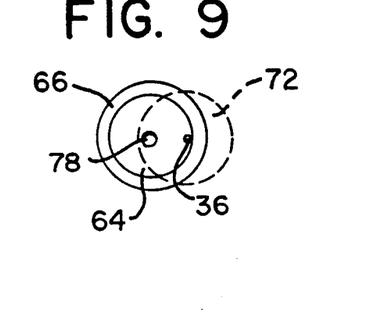
FIG. 9 is an image seen through the viewfinder of FIG. 1 after extension of the line as in FIG. 8 but before adjusting to effect an overlap.
Figure 10:
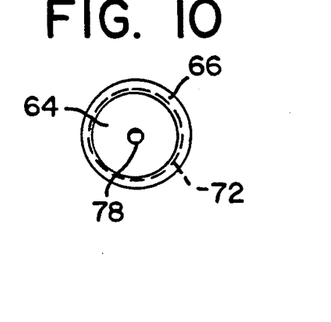
FIG. 10 is the same type of view as in FIG. 9 except after adjustment to affect the overlap.

FIGS. 9 and 10 are views of what is seen through the viewfinder 10 when trying to align the line element 46 (FIG. 8) with the virtual optical axis 20. Beneath the tripod stand 82 for the optical measuring instrument 8 (see FIG. 5) is a conventional adjustable plate (not shown) which is rotatable and moveable up and down. This adjustable plate is adjusted so as to make the circular edge of the round reticle 36 overlap with one of the concentric circles 72 of the center plate 62 (FIG. 7) Thus, the image seen through the viewfinder moves from the non-overlapped position of FIG. 9 to the overlapped position of FIG. 10.

Figure 11:
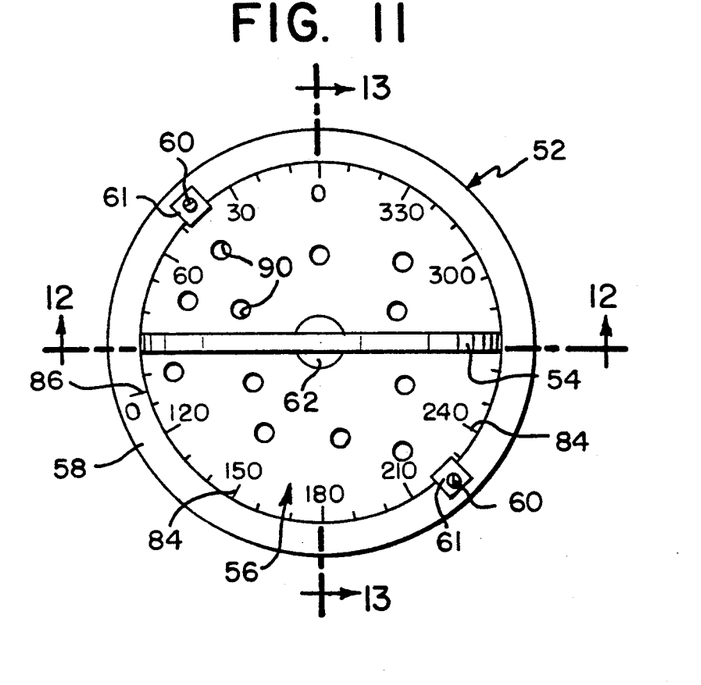
FIG. 11 is a front planar view of an angle indicator in accordance with the invention with the center plate of FIG. 7.
Figure 12:
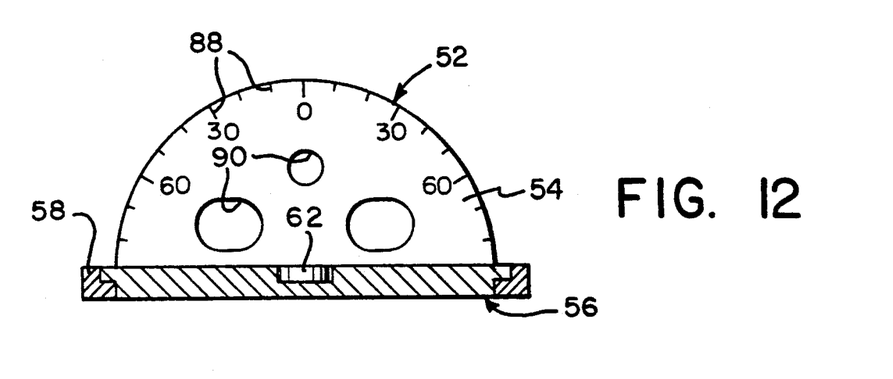
FIG. 12 is a partial cross-section taken across lines 12—12 of FIG. 11.
Figures 13, 15, 16:
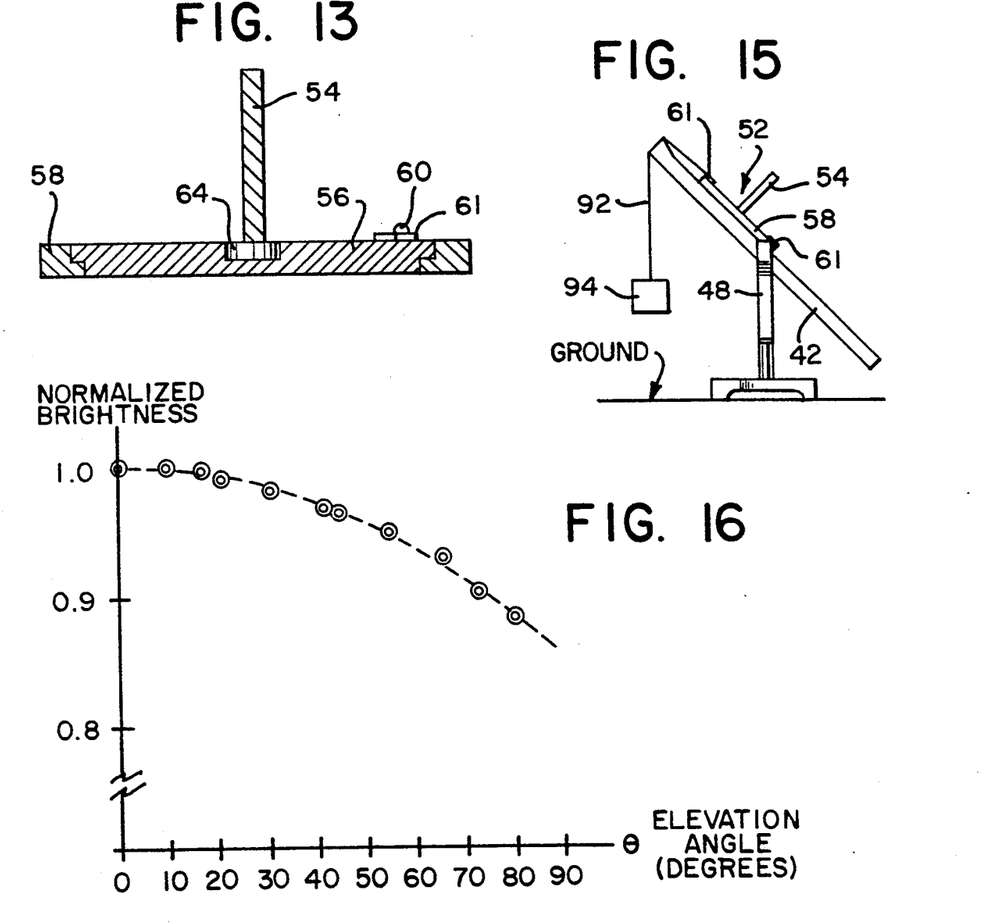
FIG. 13 is a partial cross-section taken across lines 13—13 of FIG. 11.
FIG. 15 is schematic elevation side view of the angle indicator secured to the screen of FIG. 5 where the screen is at an oblique angle and a plumb line is employed.
FIG. 16 is a graphical representation of normalized brightness with respect to elevation angle as measured in accordance with the present invention for a white diffusing planar surface.

FIGS. 11-13 show the angle indicator 52 of FIG. 5 which has the azimuth angle indication disc 56 rotatable within the confines of the ring base 58. Tightening of the fasteners 60, e.g., screws, causes a metal plate 61 beneath their heads to simultaneously press against the base 58 and azimuth angle indication disc 56, which locks them together. The screws either threadably fit into a threaded hole in the base 58 or a nut is arranged on the opposite side of the ring base 58 to secure the screws whose stems pass through holes in the base. The fastening of the disc 56 and the ring base 58 together takes place preferably before the angle indicator is secured to the screen 42.

The azimuth angle indication disc 56 has azimuth angle gradations 84 about its periphery marking degrees of a circle. A reference mark 86 is provided on the ring base 58 so that the extent of rotation of the azimuth angle indication disc 56 with respect to the ring base 58 may be ascertained by reading the corresponding angle with respect to the azimuth angle gradations 84. It should be understood that the same effect is achieved where the base 58 has the azimuth gradations and the disc 56 has the reference mark 86 instead.

The elevation angle disc 54 extends substantially perpendicular to the azimuth angle disc 56 and has elevation angle gradations 88 which define angles of a semicircle. The disc 54 preferably has a semicircular face. The elevation angle gradations 88 may be located about the periphery of the disc 54 as shown. The disc 56 preferably has a circular shape. In order to reduce weight, both the discs 54 and 56 may have holes 90 and may have other configurations.

Figure 14:
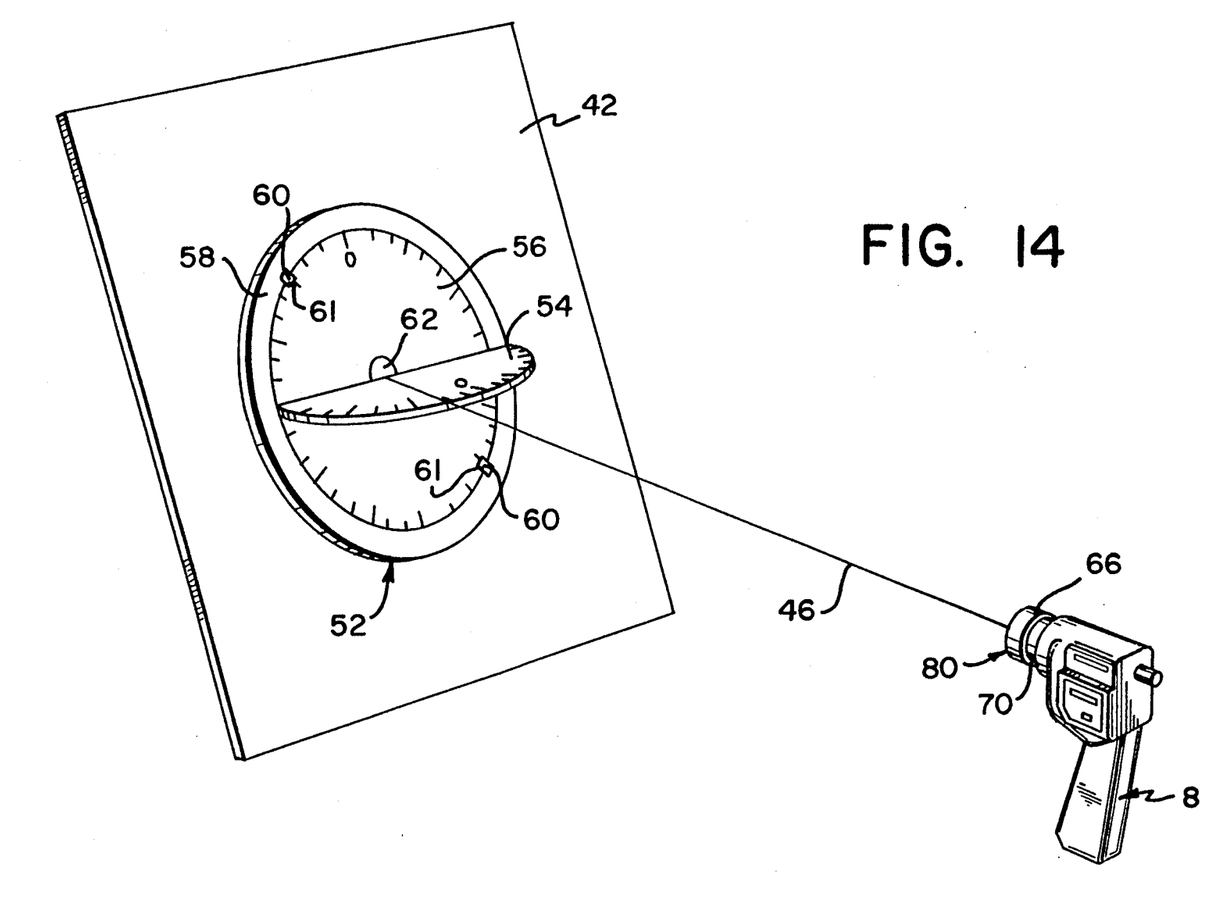
FIG. 14 is an enlarged perspective view of the angle indication system of FIG. 6 for one viewing angle.

In general, after assembly, the arrangement is as shown in FIG. 14. FIG. 15 further shows the screen 42 in an oblique angular orientation with respect to the ground. A plumb line 92 is secured to an edge of the ring base 58 in order to help counterbalance the weight of the angle indicator 52.

The assembly and initial set-up is as follows. Referring to FIGS. 11-13, the reference mark 86 on the ring base 58 is aligned with the zero degree azimuth gradation on the azimuth angle indication disc 56. The ring base 58 and the disc 56 are then secured together by tightening the fastener 60 by screwing.

Referring to FIG. 6, the line element 46 is inserted through the central hole 78 of the circular plate 64 and then back through the other hole 80. The metal ring 66 is threadably secured to the peripheral rim 70 about the objective lens 24 of the optical measuring instrument.

Thereafter, referring to FIG. 8, the line element 46 is tied into a knot 76 in the hole 74. The angle indicator 52 is then secured to the screen magnetically as in FIG. 14, perhaps assisted by a plumb line 92 of FIG. 15.

After this, the optical measuring instrument 8 is positioned at a desired distance away from the screen 42 and the line element 46 is made taut by pulling through the other hole 80 as needed. The optical measuring instrument 8 may be located at any desired viewing angle, such as those shown in FIG. 5.

Figure 7:
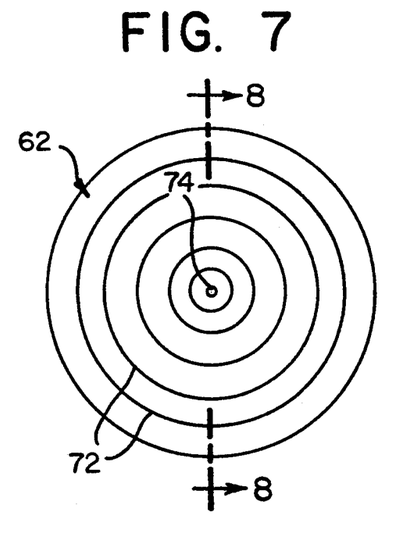
FIG. 7 is a front view of a center plate of an angle indicator in accordance with the present invention.

Next, the viewfinder 10 is looked through to find the central hole 78 of the circular plate 64. The plate beneath the tripod stand 82 is adjusted as needed to align the image of the central hole 78 with the center of the reticle. This alignment is realized when the circular edge of the round reticle 36 overlaps with one of the concentric circles 72 (FIGS. 9 and 10) on the center plate 62 (FIG. 7). At this moment of alignment, the line element 46 forms a straight line between the center hole 78 of the circular plate 64 and the hole 74 of the center plate 62 so that the virtual optical axis 20 is now aligned with the line element 46.

The azimuth angle may then be read by loosening the fastener 60 and rotating the azimuth angle indication disc 56 as necessary until the line element 46 touches the elevation angle indication disc 54. In this touching condition, the reference mark 86 points to an azimuth angle to which the disc 56 has been rotated. This azimuth angle is read with respect to the azimuth angle gradations 84. If the screen 42 is perpendicular to the ground, then the azimuth angle is zero degrees.

The elevation angle is read from where the line element 46 passes with respect to the elevation angle gradations 88 as it touches along a face of the disc 54.

The azimuth and elevation angles may be recorded and the location of the point on the screen 42 where the virtual optical axis intersects the screen 42 should be noted. Since the center plate 62 is transparent, the brightness and color coordinates of the screen 42 may be measured as detected by the detectors 34R, 34G, 34B.

Thereafter, the system is disassembled in reverse sequence and the optical measurement system is repositioned to a different location for further measurement taking.

Typical readings for a white screen have been plotted in FIG. 16 by measuring brightness at different viewing angles to the right of the zero degree angle of elevation of the elevation angle gradations (i.e., by relocating the optical measurement instrument 8 at the viewing angles indicated for each plotted point). Based on these measurements, it can be seen that the level of brightness of the screen decreases as the viewing angle increases away from the zero degree elevation angle. This information is useful for plotting a curve to find screen gain at different viewing angles as in FIG. 2 for different screens so that a suitable screen may be selected for a given video projection application.

Color coordinates may be measured with the Minolta Chromameter CS-100 as well. For an understanding of color coordinates, an explanation is provided in a book entitled "Color Science, Concept and Methods. Quantitative Data and Formulae", 2nd edition, Gunter Wyszecki, W. S. Stiles, John Wiley & Sons, 1982.

Figure 17:
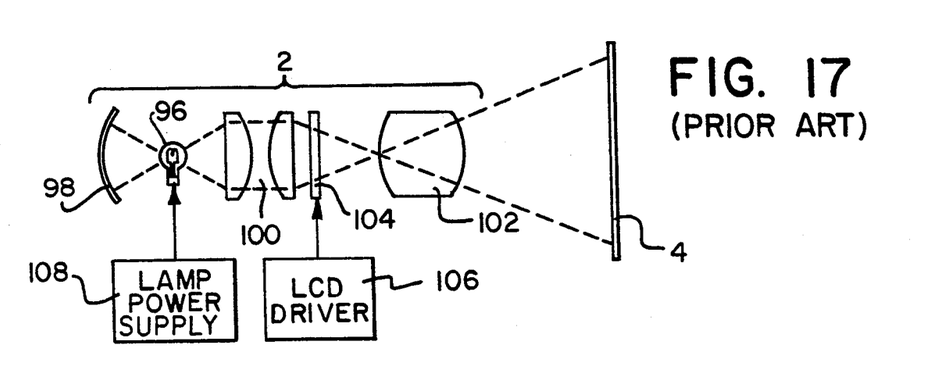
FIG. 17 is a schematic representation of the video projector of FIG. 1 which may be used to produce an image on the screen to be measured.

FIG. 17 is a schematic of the video projector 2 of FIG. 1 which may be used to project an image onto the screen 4. The projector 2 contains a lamp 96 whose light reflects off a rear reflector 98 and is directed through a condenser lens 100 to enter a projection lens 102 which projects the light to the screen 4. An LCD panel 104 is interposed between the condenser lens and the projection lens 102 to serve as a type of shutter for selectively blocking and allowing the passage of light from the condenser lens 100 to reach the projection lens 102. The liquid crystal displays are selectively driven by an LCD driver 106 to open or close as desired to form a desired image to be projected onto the screen 4. The lamp 96 is powered by a conventional lamp power supply 108.

While the foregoing description and drawings represent the preferred embodiments of the present invention, it will be understood that various changes and modifications may be made without departing from the spirit and scope of the present invention.

What is claimed is:

1. A method useful for determining an angle between a virtual axis and a planar surface, the method comprising the steps of:

identifying a virtual optical axis between an objective lens and a planar surface of an object;

extending a visible line element between an objective lens and a planar surface;

coinciding the extended visible line element with the virtual optical axis; and determining an angle between the extended visible line element and the planar surface with respect to azimuth and elevation, the angle being indicative of the angle between the virtual optical axis and the planar surface, the step of determining taking place after the step of coinciding.

2. A method as in claim 1, wherein the step of extending includes passing the line element through a center of a plate element that is secured in position on the planar surface, the step of identifying including looking through a viewfinder which contains a focal plane element with a reticle through which passes the virtual optical axis, the step of coinciding including aligning the center of the reticle with an image of the center of the plate element as viewed through the viewfinder, whereby the aligning means causes the virtual optical axis to coincide with the visible line element.

3. A method as in claim 2, wherein the plate element has a plurality of concentric circles of increasing diameter about the center of the plate element, the reticle having a circular edge, the step of identifying including overlapping the circular edge with an edge of one of the concentric circles as viewed through the viewfinder by adjusting a position of the viewfinder with respect to the planar surface as necessary for effecting the overlapping, the overlapping causing the aligning to result.

4. A method as in claim 2, wherein the step of extending includes making the line element taut by pulling the line through a hole in a transparent element which is between the objective lens and the planar surface.

5. A method as in claim 4, further comprising mounting the transparent element to the objective lens.

6. A method as in claim 1, further comprising the step of selecting the type of the line element from the group consisting of string, thread, wire, cord, cable and rope.

7. A method as in claim 1, wherein the step of extending includes touching the line element with an elevation angle indicator that has elevation angle gradations and the step of determining includes reading the elevation angle where the line element touches the elevation angle indicator with respect to the gradations.

8. A method as in claim 7, further comprising the step of rotating an azimuth indicator with respect to a base until a relative position of the azimuth indicator with respect to the base is reached where the line element touches a face of the elevation indicator, the elevation indicator being attached to and rotatable with the azimuth angle indicator, the step of determining including reading the azimuth angle with respect to azimuth angle gradations found at the relative position of the base and azimuth angle indicator, at least one of the base and the azimuth angle indicator having the azimuth angle gradations.

9. A method as in claim 1, further comprising relocating the objective lens to another position relative to the planar surface and repeating the steps of identifying, extending and determining with respect to the objective lens being at the another position.

10. A method as in claim 1 in combination with a step of measuring a brightness level of the planar surface as taken from the same position at which the angle is determined.

11. A method as in claim 1, in combination with a step of measuring a color coordinate of the planar surface as taken from the same position at which the angle is determined.

12. An apparatus useful for determining an angle between a virtual axis and a planar surface, comprising:

means for identifying a virtual optical axis between an objective lens and a planar surface of an object;

means for holding a visible line element between said objective lens and said planar surface;

means for coinciding the visible line element with the virtual optical axis; and means for determining an angle between the extended visible line element and the planar surface with respect to azimuth and elevation, the angle being indicative of the angle between the virtual optical axis and the planar surface.

13. An apparatus as in claim 12, wherein said line element is passed through a center of a plate element that is secured in position on the planar surface, said means for coinciding including means for aligning a center of a reticle of a focal plane element with an image of the center of the plate element as viewed through a viewfinder which contains the focal plane element so as to cause the virtual optical axis to coincide with the visible line element.

14. An apparatus as in claim 13, wherein the plate element has a plurality of concentric circles of increasing diameter about the center of the plate element, the reticle having a circular edge, said aligning means including means for overlapping the circular edge with an image of one of the concentric circles as viewed through the viewfinder by adjusting a position of the viewfinder with respect to the planar surface as necessary, whereby the aligning is a result of the overlapping.

15. An apparatus as in claim 13, further comprising means for making the line element taut, said making means including a hole in a transparent element through which is pulled the line element, said transparent element being between the objective lens and the planar surface.

16. An apparatus as in claim 15, further comprising means for mounting the transparent element to the objective lens.

17. An apparatus as in claim 12, wherein the visible line element is of a type selected from the group consisting of string, thread, wire, cord, cable and rope.

18. An apparatus as in claim 12, further comprising an elevation indicator having a face touching the line element, said elevation angle indicator having elevation angle gradations with respect to which may be read the angle with respect to elevation based on where the line element touches the elevation angle indicator.

19. An apparatus as in claim 18, further comprising a base, an azimuth angle indicator rotatable with respect to said base, said elevation angle indicator being attached to and rotatable with said azimuth angle indicator, at least one of said base and said azimuth angle indicator having azimuth angle gradations, said azimuth angle indicator being rotatable with respect to said base to a relative position where said line element touches said elevation angle indicator, an angle being readable with respect to azimuth gradations at said relative position where said line element touches said elevation angle.

20. An apparatus as in claim 12; further comprising:
an optical axis indication element adapted for attachment about the objective lens;
a plate having means for retaining an end of said visible line element, said plate being spaced from said optical axis indication element, said determining means including means for enabling reading of an angle between a planar surface and the line element, said enabling means having angle gradations indicative of different angles and being arranged with respect to said plate so that the angle may be read based on where said visible line element touches said enabling means with respect to said angle gradations.

21. An apparatus as in claim 20, wherein said enabling means includes a base element, a circular element having azimuth angle gradations and another element projecting substantially perpendicular to said circular element and having elevation angle gradations, said circular element being rotatable with respect to said base element.

22. An apparatus as in claim 20, wherein said optical axis indication element is transparent and said plate is transparent.

23. An apparatus useful for determining an angle between a virtual optical axis and a planar surface, comprising:
a base element defining an inner space;
an azimuth angle element being freely rotatable within said space and having a surface which extends along a plane;
azimuth gradations marked on at least one of said base element and said azimuth angle element;
an elevation angle element mounted on said azimuth angle element so as to project substantially perpendicular from said surface of said azimuth angle element;
elevation gradations marked on said elevation angle element; and
means for retaining a line element at a radial center area of said azimuth angle element so that the line element extends from said plane and along a virtual optical axis of an objective lens and be touching said elevation angle element.

24. An apparatus as in claim 23, wherein said retaining means includes a transparent plate having a hole through which may pass the line element.

25. An apparatus as in claim 23, wherein said azimuth gradations read from 0 to 360 degrees, said elevation gradations reading from −90 to 90 degrees.

26. An apparatus as in claim 23, wherein said azimuth angle element has a circular periphery, said base is ring-shaped, said elevation angle disc being semicircular.

27. An apparatus as in claim 26, wherein said azimuth angle element has a plurality of holes.

28. An apparatus as in claim 23, further comprising an optical axis indication element from which extends the line element to said retaining means, said optical axis indication element being adapted for attachment to an objective lens housing.

29. An apparatus as in claim 28, wherein said line element is of a type selected from the group consisting of a thread, string, card rope, wire and cable.

30. An apparatus as in claim 28, wherein said optical axis indication element has a center area with a center hole through which passes the line element.

31. An apparatus as in claim 28, wherein said optical axis indication element further has another hole spaced from said center hole and through which passes the line element.

32. An apparatus as in claim 23, further comprising means for releasably fixing said azimuth angle element to said base plate.

33. An apparatus as in claim 23, further comprising magnetic means on a back of said base plate.

34. An apparatus as in claim 23, wherein said base plate has an edge to which is attached a line with a plumb.

* * * * *